US012630049B2

(12) United States Patent
Morishita

(10) Patent No.: US 12,630,049 B2
(45) Date of Patent: May 19, 2026

(54) CONTROL SYSTEM

(71) Applicant: TOYOTA JIDOSHA KABUSHIKI KAISHA, Toyota (JP)

(72) Inventor: Yasuyuki Morishita, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 18/934,426

(22) Filed: Nov. 1, 2024

(65) Prior Publication Data

US 2025/0187489 A1     Jun. 12, 2025

(30) Foreign Application Priority Data

Dec. 8, 2023     (JP) ................................. 2023-207637

(51) Int. Cl.
　　*B60L 58/10*　　　(2019.01)
　　*B60L 15/00*　　　(2006.01)
(52) U.S. Cl.
　　CPC ............. *B60L 58/10* (2019.02); *B60L 15/007* (2013.01); *B60L 2210/10* (2013.01)

(58) Field of Classification Search
　　CPC .... B60L 58/10; B60L 15/007; B60L 2210/10; B60L 2240/547; B60L 2240/549; B60L 58/20; B60L 2240/54; B60R 16/0232
　　See application file for complete search history.

(56) References Cited

U.S. PATENT DOCUMENTS 10,286,899 B2 * 5/2019 Barkdull ................. B60L 58/13
2014/0203759 A1 7/2014 Sugiyama
2020/0016980 A1 * 1/2020 Seta ........................ B60L 50/61

FOREIGN PATENT DOCUMENTS

JP 　 2007161081 A 　 6/2007
JP 　 2014140268 A 　 7/2014

* cited by examiner

*Primary Examiner* — Bao Long T Nguyen
(74) *Attorney, Agent, or Firm* — Dickinson Wright, PLLC

(57) ABSTRACT

A control system includes a first control device configured to acquire a state of an in-vehicle device and configured to transmit information based on the state of the in-vehicle device, a second control device configured to receive the information from the first control device and configured to control the in-vehicle device based on the information, and a communication relay configured to relay communication of the information between the first control device and the second control device.

5 Claims, 2 Drawing Sheets

CONTROL SYSTEM

CROSS-REFERENCE TO RELATED APPLICATION

This application claims priority to Japanese Patent Application No. 2023-207637 filed on Dec. 8, 2023, incorporated herein by reference in its entirety.

BACKGROUND

1. Technical Field

The present disclosure relates to a control system mounted in a vehicle.

2. Description of Related Art

Japanese Unexamined Patent Application Publication No. 2014-140268 (JP 2014-140268 A) discloses a power supply system of a vehicle including a high-voltage battery (first power storage device) that stores power for traveling and an auxiliary battery (second power storage device) that stores power for an auxiliary device. In the power supply system, a power storage amount of the auxiliary battery is monitored while the vehicle is parked, and the auxiliary battery is charged with the power of the high-voltage battery when the power storage amount of the auxiliary battery is decreased, so that the auxiliary battery is prevented from running out.

SUMMARY

In order to appropriately execute charge control of the auxiliary battery using the power of the high-voltage battery, there is a need to provide a device that is responsible for the charge control with information on the auxiliary battery. The information on the auxiliary battery is directly transmitted and received by a wire (direct line) connecting a device that acquires the information and a device that is responsible for the charge control of the battery, or is transmitted and received by communication using a communication network including both devices.

When the transmission and the reception of the information on the auxiliary battery are performed between the device that acquires the information on the battery and the device that is responsible for the charge control of the battery by using the communication network, a communication relay may be inserted between the devices. The communication relay is a device that requires power for a relay operation. Therefore, in a configuration in which communication of the information on the auxiliary battery is performed via the communication relay, operating the communication relay intermittently to reduce power consumption as much as possible is desirable in order to prevent the battery from running out in a scene where power generation is not performed, such as while the vehicle is parked.

However, when the communication relay is intermittently operated, the information on the auxiliary battery does not reach the device that is responsible for the charge control of the battery from the device that acquires the information on the battery during a period in which the communication relay is stopped. As a result, the device that is responsible for the charge control of the battery cannot appropriately execute the charge control of the auxiliary battery.

The present disclosure provides a control system capable of achieving both intermittent operation of a communication relay and appropriate control of an in-vehicle device in a configuration in which communication of information relating to control of the in-vehicle device (an auxiliary battery, and the like) is performed between devices via the communication relay.

An aspect of the present disclosure relates to a control system mounted in a vehicle to control an in-vehicle device. The control system includes a first control device, a second control device, and a communication relay. The first control device is configured to acquire a state of the in-vehicle device and is configured to transmit information based on the state of the in-vehicle device. The second control device is configured to receive the information from the first control device and is configured to control the in-vehicle device based on the information. The communication relay is configured to relay communication of the information between the first control device and the second control device. The communication relay is configured to, while the vehicle is parked and the communication relay is operating, intermittently stop a relay operation. The second control device is configured to, while the vehicle is parked, perform control based on the information received from the first control device via the communication relay, and is configured to, while the vehicle is parked and the communication relay is stopped, maintain control immediately before the communication relay is stopped.

In the aspect of the present disclosure, the in-vehicle device may be a battery, and the first control device may be configured to acquire a current flowing through the battery as the state of the in-vehicle device, and may be configured to transmit an integrated value of the current as the information.

In the aspect of the present disclosure, the second control device may be configured to, in a case where the integrated value of the current received as the information indicates a discharge state, control the battery in a direction in which the discharge state is resolved, and may be configured to, in a case where the integrated value of the current indicates a charge state, control the battery in a direction in which the charge state is resolved.

In the aspect of the present disclosure, the second control device may be configured to control the battery by controlling an indicated voltage value indicating an output voltage of a DCDC converter that receives power of another battery different from the battery and outputs converted power to the battery.

In the aspect of the present disclosure, the first control device and the second control device may be configured to, while the vehicle is parked, operate during a period in which outflow of a predetermined current from the battery is detected, and the communication relay may be configured to, while the vehicle is parked, intermittently operate during the period in which the first control device and the second control device are operating.

According to the aspect of the present disclosure, it is possible to achieve both intermittent operation of a communication relay and appropriate control of an in-vehicle device in a configuration in which communication of information relating to control of the in-vehicle device is performed between devices via the communication relay.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

In a case where a state of an auxiliary battery while a vehicle is parked is managed, a control system according to the present disclosure executes charge control of the auxiliary battery based on an integrated value of all currents that have flowed in and out of the auxiliary battery so far, rather than a present current flowing in and out of the auxiliary battery. As a result, even in a case where provision (communication) of the integrated current value to a device that is responsible for the charge control of the auxiliary battery is temporarily interrupted, the charge control of the auxiliary battery can be appropriately executed based on the integrated current value when the provision (communication) is restarted. Hereinafter, an embodiment of the present disclosure will be described in detail with reference to the drawings.

Embodiment

Configuration

Figure 1:
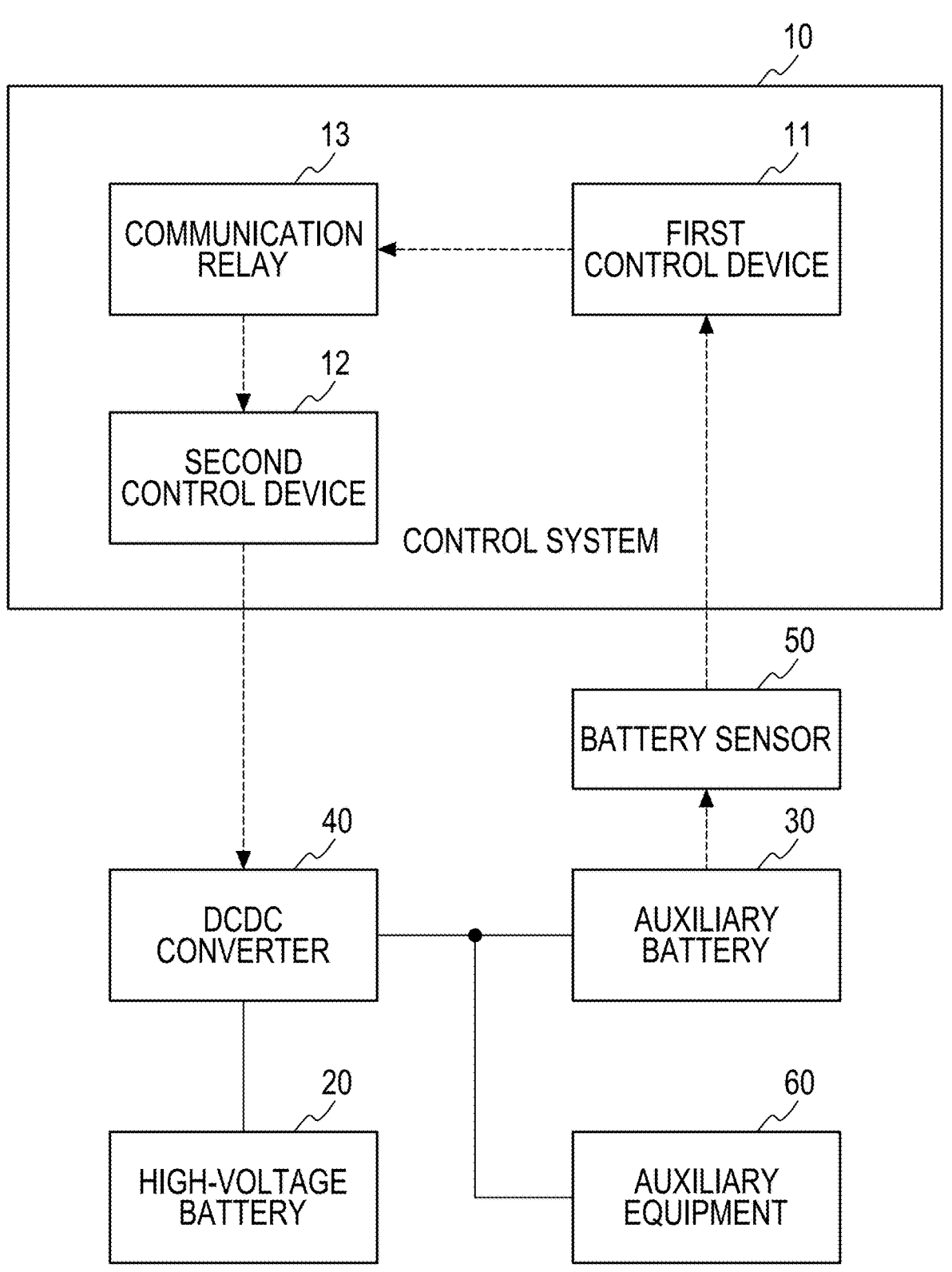
FIG. 1 is a functional block diagram of a control system and peripheral units thereof according to an embodiment of the present disclosure.

FIG. 1 is a functional block diagram of a control system 10 and peripheral units thereof according to the embodiment of the present disclosure. The functional blocks shown in FIG. 1 include the control system 10, a high-voltage battery 20, an auxiliary battery 30, a DCDC converter 40, a battery sensor 50, and auxiliary equipment 60. The control system 10 includes a first control device 11, a second control device 12, and a communication relay 13.

In FIG. 1, a power line through which power is transmitted and received is indicated by a solid line, and a signal line through which a detected value, a calculated value, a control instruction, and the like are transmitted is indicated by a broken line. The control system 10 of the present embodiment is mounted in a vehicle, such as a hybrid electric vehicle (HEV), a plug-in hybrid electric vehicle (PHEV), a fuel cell electric vehicle (FCEV), and a battery electric vehicle (BEV).

The high-voltage battery 20 is a secondary battery configured to be chargeable and dischargeable, such as a lithium ion battery. The high-voltage battery 20 is a battery for supplying power to a high-voltage system including a so-called main engine (not shown) involved in vehicle traveling, such as a traveling electric motor. The high-voltage battery 20 is connected to the auxiliary battery 30 via the DCDC converter 40 so that the auxiliary battery 30 can be charged.

The auxiliary battery 30 is a secondary battery configured to be chargeable and dischargeable, such as a lithium ion battery. The auxiliary battery 30 is a battery for supplying power to an auxiliary system including the auxiliary equipment 60. In general, a rated voltage of the auxiliary battery 30 is set lower (for example, 12 V) than a rated voltage of the high-voltage battery 20. A state of the auxiliary battery 30 is monitored by the battery sensor 50.

The DCDC converter 40 is a power converter that can convert input power into power of a predetermined voltage and output the power. The DCDC converter 40 has a first end (primary side) connected to the high-voltage battery 20 and a second end (secondary side) connected to the auxiliary battery 30. The operation of the DCDC converter 40 is controlled by the second control device 12 of the control system 10.

The battery sensor 50 is a sensor for detecting the state of the auxiliary battery 30. Examples of the state of the auxiliary battery 30 include physical quantities, such as a voltage, a current, and a temperature. The battery sensor 50 of the present embodiment detects at least a current (charging current, discharging current) flowing through the auxiliary battery 30. The state of the auxiliary battery 30 detected by the battery sensor 50 is acquired by the first control device 11 of the control system 10.

The auxiliary equipment 60 includes a so-called auxiliary (not shown), such as equipment, an electronic control unit (ECU), and a system that are not involved in vehicle traveling. The auxiliary equipment 60 of the present embodiment includes a drive recorder in which power consumption of the auxiliary battery 30 occurs as an event, for example, when recording is started while the vehicle is parked.

The control system 10 includes the first control device 11, the second control device 12, and the communication relay 13, and executes control of a specific in-vehicle device. As the specific in-vehicle device, various equipment, an electronic control unit (ECU), and a system mounted in the vehicle can be targeted. In the present embodiment, the control system 10 will be described with reference to a case where the specific in-vehicle device is the auxiliary battery 30 as an example.

The first control device 11 is configured to acquire the current flowing through the auxiliary battery 30 detected by the battery sensor 50, and to integrate the acquired current to obtain an integrated current value. The first control device 11 is typically configured as an electronic control unit (for example, ZONE-ECU) including a processor, a memory, an input and output interface, and the like, such as a microcomputer. The current integration starts from zero (0) when the first control device 11, which is stopped (sleeping) while the vehicle is parked, starts up (wakes up), and continues until the first control device 11 is stopped again. The first control device 11 transmits the integrated current value obtained by itself to the communication relay 13. The transmission is performed based on a predetermined cycle, a timing, and the like during a period in which the first control device 11 is operating.

The second control device 12 is configured to receive the integrated current value obtained by the first control device 11 from the communication relay 13, and to control the operation of the DCDC converter 40 based on the received integrated current value. The second control device 12 is typically configured as an electronic control unit (for example, HV-ECU) including a processor, a memory, an input and output interface, and the like, such as a microcomputer. In addition, in a case where the second control device 12 cannot receive the integrated current value from the communication relay 13 due to the stop of the communication relay 13 (when communication is interrupted), the second control device 12 can control the operation of the DCDC converter 40 without being based on the integrated current value.

The communication relay 13 is included in a communication network including the first control device 11 and the second control device 12, and is configured to relay communication of information between the first control device 11 and the second control device 12 (for example, a gateway). The information relayed by the communication relay 13 of the present embodiment is the integrated current value obtained by the first control device 11. The communication relay 13 executes an intermittent operation of repeating startup (wakeup) and stop (sleep) in a scene where the auxiliary battery 30 cannot be charged by power generation of the vehicle or power supply from an external power supply facility, such as while the vehicle is parked. The intermittent operation reduces power consumption of the communication relay 13, which leads to prevention of running-out of the auxiliary battery 30. While the communication relay 13 is stopped, the relay operation of the information is not performed (communication is interrupted).

In the present embodiment, an interval of the intermittent operation performed by the communication relay 13 is set shorter than an interval of an intermittent operation performed by the first control device 11 and the second control device 12. That is, the communication relay 13 performs the intermittent operation at least once during a period in which the first control device 11 and the second control device 12 operate.

Control

Figure 2:
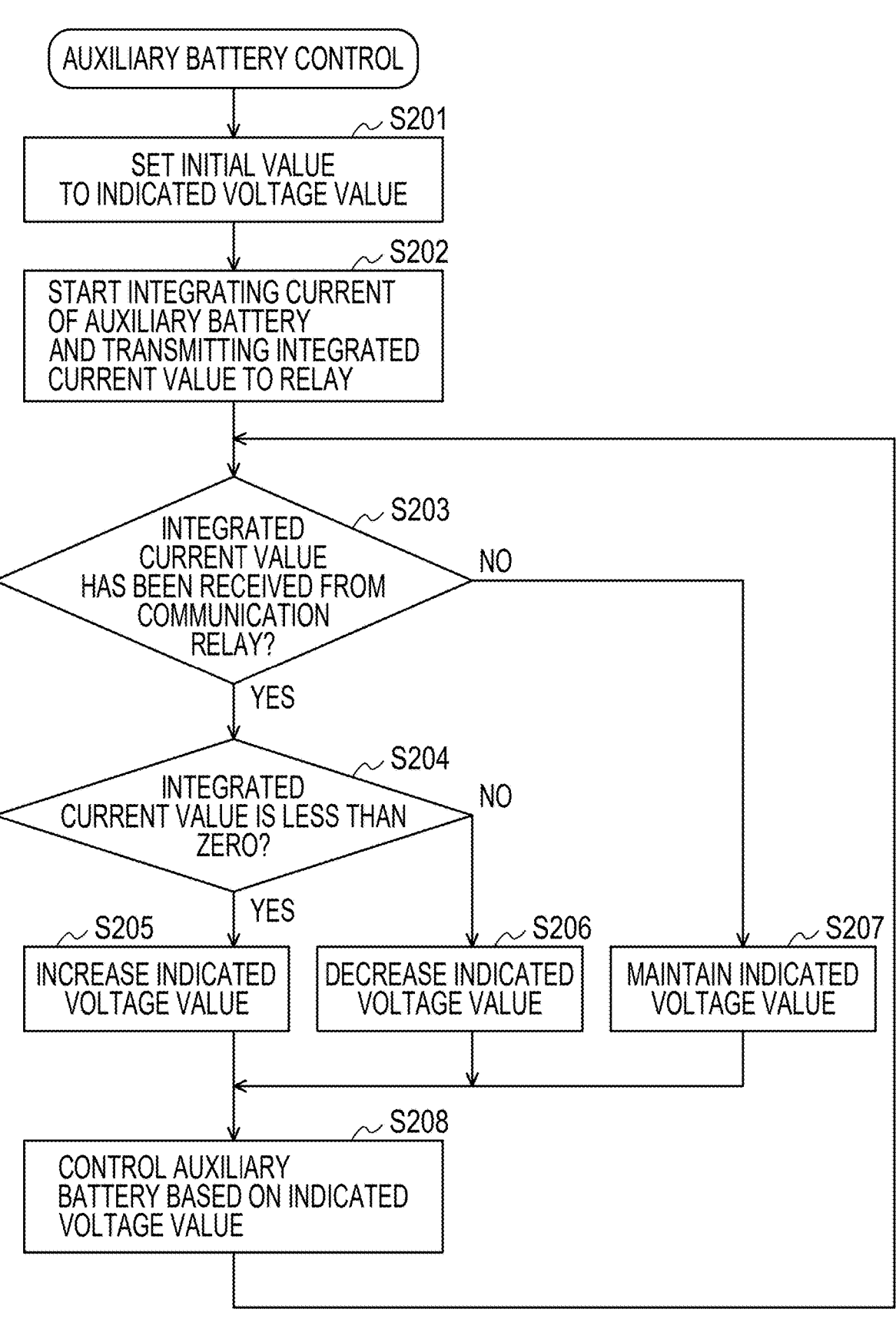
FIG. 2 is a processing flowchart of auxiliary battery control executed by the control system.

Next, control performed by the control system 10 according to the embodiment of the present disclosure will be described with further reference to FIG. 2. FIG. 2 is a flowchart illustrating a processing procedure of auxiliary battery control executed by the control system 10.

The auxiliary battery control illustrated in FIG. 2 is started when a predetermined event that consumes the power of the auxiliary battery 30 occurs, such as while the vehicle is parked, and is continued until the event ends. The event can be a discharge state in which a current equal to or more than a predetermined value flows out from the auxiliary battery 30, and can be exemplified by a scene in which the drive recorder included in the auxiliary equipment 60 starts recording. In response to the occurrence of the event, the first control device 11, the second control device 12, and the communication relay 13 are each started up (woken up).

Step S201

The second control device 12 of the control system 10 sets an indicated voltage value indicating an output voltage of the DCDC converter 40 to a predetermined initial value. When the initial value is set to the indicated voltage value of the DCDC converter 40 by the second control device 12, the process proceeds to step S202.

Step S202

The first control device 11 of the control system 10 starts integrating the current of the auxiliary battery 30 acquired from the battery sensor 50 to obtain an integrated current value and transmitting the integrated current value to the communication relay 13. The first control device 11 calculates the integrated current value by regarding the charging current flowing into the auxiliary battery 30 as a positive sign and the discharging current flowing out of the auxiliary battery 30 as a negative sign. When the first control device 11 calculates the integrated current value of the auxiliary battery 30 and transmits the integrated current value to the communication relay 13, the process proceeds to step S203.

Step S203

The second control device 12 of the control system 10 determines whether or not the integrated current value of the auxiliary battery 30 has been received from the communication relay 13. The determination is made to determine whether the communication relay 13 is in an operation state in which communication is possible or in a stop state in which communication is not possible. When the second control device 12 receives the integrated current value of the auxiliary battery 30, the second control device 12 determines that the communication relay 13 is in the operation state (step S203, YES), and the process proceeds to step S204. On the other hand, when the second control device 12 does not receive (cannot receive) the integrated current value of the auxiliary battery 30, the second control device 12 determines that the communication relay 13 is in the stop state (step S203, NO), and the process proceeds to step S207.

Step S204

The second control device 12 of the control system 10 determines whether or not the integrated current value of the auxiliary battery 30 received from the communication relay 13 is less than zero (0). The determination is made to determine whether the auxiliary battery 30 is in a discharge state in which an outflow current is larger than an inflow current or in a charge state in which the outflow current is smaller than the inflow current. As described above, the current of the auxiliary battery 30 is expressed with a sign, so that the charge and discharge state of the auxiliary battery 30 can be grasped depending on which side the integrated current value is biased with respect to zero (0). When the second control device 12 determines that the integrated current value of the auxiliary battery 30 is less than zero (0) (step S204, YES), the process proceeds to step S205. On the other hand, when the second control device 12 determines that the integrated current value of the auxiliary battery 30 is equal to or greater than zero (0) (step S204, NO), the process proceeds to step S206.

Step S205

The second control device 12 of the control system 10 increases the indicated voltage value of the DCDC converter 40 on the assumption that the auxiliary battery 30 is in the discharge state (setting update). An increase amount of the indicated voltage value can be optionally set based on a capacity of the auxiliary battery 30, a current state of charge, or the like. An appropriate value is set such that the state of the auxiliary battery 30 changes in a direction in which the discharge state is resolved within a range in which an overvoltage does not occur in the auxiliary battery 30. When the indicated voltage value of the DCDC converter 40 is increased by the second control device 12, the process proceeds to step S208.

Step S206

The second control device 12 of the control system 10 decreases the indicated voltage value of the DCDC converter 40 on the assumption that the auxiliary battery 30 is in the charge state (setting update). A decrease amount of the indicated voltage value can be optionally set based on a capacity of the auxiliary battery 30, a current state of charge, or the like. An appropriate value is set such that the charging of the auxiliary battery 30 from the high-voltage battery 20 is stopped and the state of the auxiliary battery 30 changes in a direction in which the charge state is resolved. When the indicated voltage value of the DCDC converter 40 is decreased by the second control device 12, the process proceeds to step S208.

Step S207

Since the second control device 12 of the control system 10 does not have the integrated current value of the auxiliary battery 30 and does not know the current state of the auxiliary battery 30, the second control device 12 maintains the indicated voltage value of the DCDC converter 40 at the current value (maintenance setting). That is, when the communication relay 13 is intermittently stopped (sleeps) and the communication is interrupted, the second control device 12 controls the auxiliary battery 30 using the indicated voltage value set based on the integrated current value of the auxiliary battery 30 received immediately before the communication relay 13 is stopped. When the indicated voltage value of the DCDC converter 40 is maintained by the second control device 12, the process proceeds to step S208.

Step S208

The second control device 12 of the control system 10 controls the auxiliary battery 30 based on the set indicated voltage value. The control is executed until the indicated voltage value is reset in any of steps S205 to S207. When the second control device 12 performs the control of the auxiliary battery 30 based on the indicated voltage value, the process proceeds to step S203.

In step S204, a determination is made to compare the integrated current value of the auxiliary battery 30 with zero (0) in order to perform control aimed at maintaining the current state of the power storage amount of the auxiliary battery 30. However, in a case where the power storage amount of the auxiliary battery 30 is desired to be increased with respect to the current state, a determination need only be made to compare the integrated current value of the auxiliary battery 30 with a charge amount (Ah) determined as a target.

Action and Effect

As described above, the control system 10 according to the embodiment of the present disclosure includes the first control device 11 configured to acquire the current flowing through the auxiliary battery 30, and to integrate the acquired current to obtain an integrated current value. The first control device 11 transmits information on the integrated current value to the second control device 12 that controls the auxiliary battery 30. Then, the second control device 12 controls the auxiliary battery 30 by new control based on the integrated current value when the integrated current value can be received from the first control device 11, and controls the auxiliary battery 30 by immediately preceding control when the integrated current value cannot be received from the first control device 11.

By such a configuration and control, even in a case where the communication relay 13 that relays the communication by the intermittent operation is interposed between the first control device 11 and the second control device 12, the movement of the auxiliary battery 30 while the relay operation of the communication relay 13 is stopped can be estimated from the integrated current value after the relay is resumed. As a result, it is possible to execute appropriate battery control according to the state (discharge state, charge state) of the auxiliary battery 30.

In addition, with such a configuration and control, the communication relay 13 can be intermittently operated, so that the power consumption by the communication relay 13 can be reduced. Therefore, in a scene where the auxiliary battery 30 cannot be charged by power generation of the vehicle or power supply from the external power supply facility, such as while the vehicle is parked, the auxiliary battery 30 can be restrained from running out by a long-term operation of a device that consumes a large amount of power.

The in-vehicle device to be controlled by the control system 10 according to the present embodiment is not limited to the auxiliary battery 30 described above. All the devices mounted in the vehicle controlled based on the information communicated from the first control device 11 to the second control device 12 via the communication relay 13 can be subject to control.

An embodiment of the present disclosure has been described above, but the present disclosure can be understood not only as a control system, but also as a method executed by the control system, a program for the method, a computer-readable non-transitory storage medium storing the program, a vehicle including the control system, or the like.

The control system of the present disclosure can be applied to a vehicle or the like having a configuration in which communication of information from a control device of a transmission source to a control device of a reception destination is performed via a relay.

What is claimed is:

1. A control system mounted in a vehicle to control an in-vehicle device, the control system comprising:

a first control device configured to acquire a state of the in-vehicle device and configured to transmit information based on the state of the in-vehicle device;

a second control device configured to receive the information from the first control device and configured to control the in-vehicle device based on the information; and a communication relay configured to relay communication of the information between the first control device and the second control device, wherein:

the communication relay is configured to, while the vehicle is parked, intermittently stop a relay operation; and the second control device is configured to, while the vehicle is parked and the communication relay is operating, perform control based on the information received from the first control device via the communication relay, and is configured to, while the vehicle is parked and the communication relay is stopped, maintain control performed immediately before the communication relay is stopped.

2. The control system according to claim 1, wherein:

the in-vehicle device is a battery; and the first control device is configured to acquire a current flowing through the battery as the state of the in-vehicle device, and is configured to transmit an integrated value of the current as the information.

3. The control system according to claim 2, wherein the second control device is configured to, in a case where the integrated value of the current received as the information indicates a discharge state, control the battery in a direction in which the discharge state is resolved, and is configured to, in a case where the integrated value of the current indicates a charge state, control the battery in a direction in which the charge state is resolved.

4. The control system according to claim 3, wherein the second control device is configured to control the battery by controlling an indicated voltage value indicating an output voltage of a DCDC converter that receives power of another battery different from the battery and outputs converted power to the battery.

5. The control system according to claim 2, wherein:

the first control device and the second control device are configured to, while the vehicle is parked, operate during a period in which outflow of a predetermined current from the battery is detected; and the communication relay is configured to, while the vehicle is parked, intermittently operate during the period in which the first control device and the second control device are operating.

* * * * *